S. G. McDOWELL.
VEHICLE BODY STRUCTURE.
APPLICATION FILED SEPT. 21, 1909.
995,884.
Patented June 20, 1911.
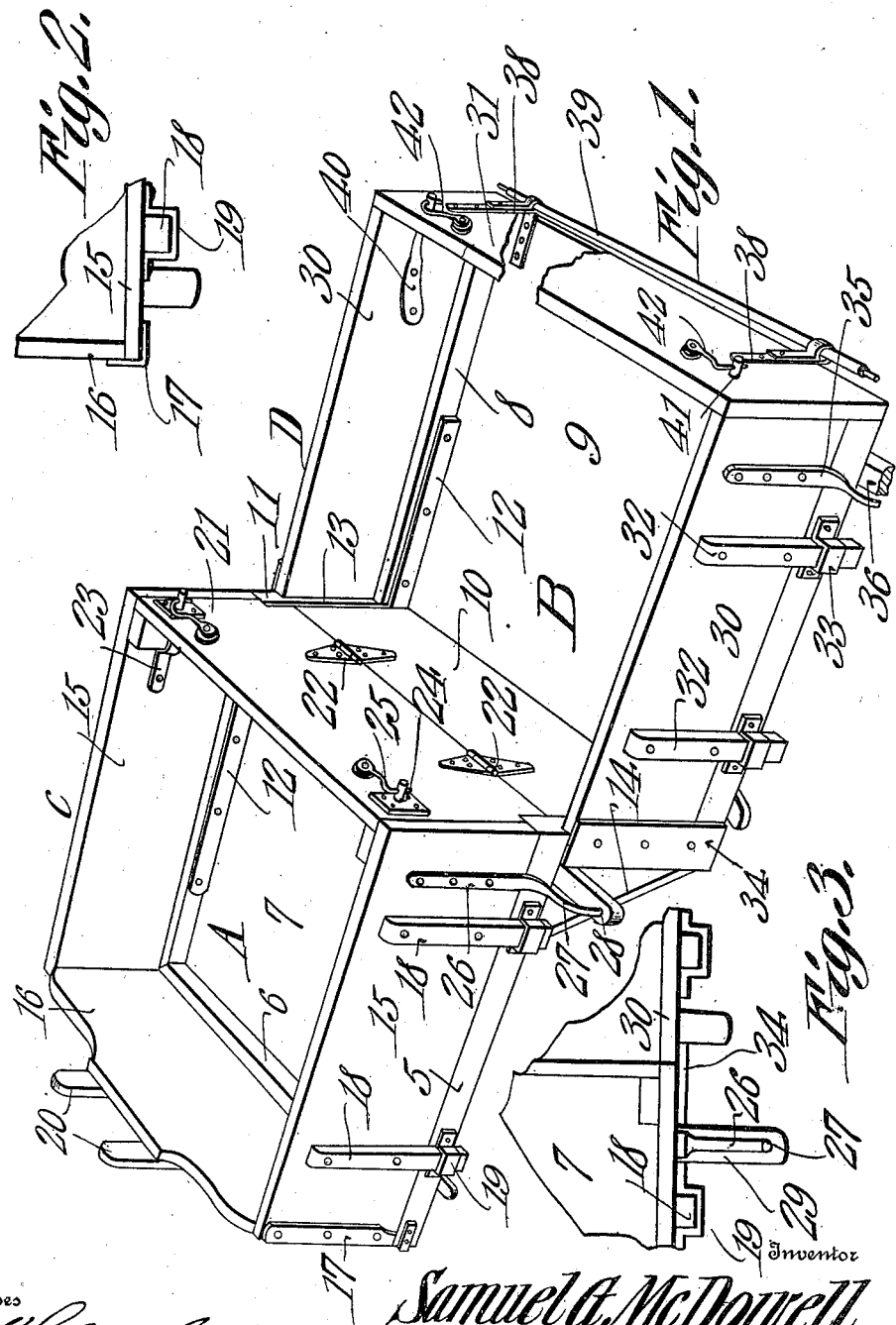
Witnesses
Inventor
Samuel G. McDowell,
By C. A. Snow & Co.
Attorneys

UNITED STATES PATENT OFFICE.

SAMUEL G. McDOWELL, OF SELMA, ALABAMA, ASSIGNOR OF ONE-HALF TO DAVID N. McDOWELL, OF SELMA, ALABAMA.

VEHICLE BODY STRUCTURE.

995,884.      Specification of Letters Patent.      Patented June 20, 1911.

Application filed September 21, 1909. Serial No. 518,758.

*To all whom it may concern:*

Be it known that I, SAMUEL G. McDOWELL, a citizen of the United States, residing at Selma, in the county of Dallas and State of Alabama, have invented a new and useful Vehicle Body Structure, of which the following is a specification.

It is the object of the present invention to provide an improved construction of vehicle, and the invention relates more specifically to a vehicle body structure.

Ordinarily, wagons of the type employed in hauling coal and the like are built with but a single box which is of considerable length and is about two feet in depth and where the forward wheels are so mounted as to turn to position beneath the forward end of the box in turning the wagon, it has been necessary to elevate the entire box to a considerable degree thereby rendering it difficult to unload. As a matter of fact it is practically impossible to satisfactorily unload such a construction of coal wagon by shoveling the coal therefrom, it being necessary for the one unloading the wagon to stand within the wagon box.

It is one object of the present invention to provide a coal wagon so constructed as to permit of its being readily unloaded by shoveling therefrom.

Briefly stated, the wagon embodying the present invention has two wagon boxes, one of which is arranged in advance of and above the other so that the rear and lower box may first be unloaded and the upper box may afterward be unloaded by standing upon the floor of the rear box and shoveling from the upper box.

In the accompanying drawings:—Figure 1 is a perspective view of the wagon-body constructed in accordance with the present invention. Fig. 2 is a plan view in detail of one forward corner of the forward one of the wagon boxes. Fig. 3 is a similar view, but looking at the intermediate portion of the body.

In the drawings, the wagon-body embodying the present invention is illustrated as comprised, in part, of vertically off-set beds, the forward one of which is indicated in general by the reference character A, and the rear one in general by the reference character B. The forward bed A is constructed, in part, of side sills 5, and a front end sill, which is indicated by the numeral 6, and which connects the forward ends of the said side sills 5. A flooring 7 is built between the side sills 5 and extends from the sill 6 rearwardly to the rear ends of the said side sills 5. The rear bed is in a like manner comprised of side sills which are indicated by the numeral 8, and between which is built a flooring 9, which extends from the forward ends of the side sills 8 to the rear ends. A wall 10, which constitutes the front end wall of the rear wagon-box when the remaining walls of such box are in set-up relation upon the rear bed B, is secured at its upper edge to the rear edge of the front bed A, and at its lower edge to the forward edge of the rear bed B. Cleats or short uprights 11 are secured at the end edges of the wall 10, and connect the adjacent ends of the respective side sills 5 and 8. The wagon-body constructed as above described is adapted to be disposed upon suitable bolsters and wheel-carrying axles, as will be readily understood, and it will further be understood, from the foregoing description, and from an inspection of Fig. 1 of the drawings, that the forward bed A is located in a plane above the rear bed B, and forwardly of the same.

In order to further brace the connection between the two beds A and B, and the vertical wall 10 connecting these beds, there are provided metallic beams, each of which has parallel terminal portions, indicated by the numeral 12, and an intermediate portion, indicated by the numeral 13, extending at right angles to the terminal portions 12 and connecting the same, it being understood that these terminal portions project in opposite directions from the upper and lower ends of the intermediate portion 13, but in parallel lines of extent, as above explained. In applying these metallic brace beams to the wagon-bed, the terminal portions 12 of the said beams are secured to the inner sides of the sills 5 and 8 of the two wagon-beds, and the intermediate portion 13 of each brace-beam is secured to the end or vertical edges of the wall 10. Brace rods 14, secured at their upper ends to the under side of the bed A, and at their lower ends to the under side of the bed B, serve to additionally brace the two beds, one with respect to the other.

A wagon-box is built upon each of the beds A and B, and, of these wagon-boxes, the one upon the bed A is indicated in general by the reference character C, and the one upon the bed B by the reference character D. The wagon-box C embodies, in its construction, side walls, which are indicated by the numeral 15, and a front end wall, indicated by the numeral 16, this said wall 16 extending from one to the other of the forward ends of the side walls 15, and being secured in this relation through the medium of angle-irons 17, secured at the forward corners of the said wagon-box C.

Secured upon the side walls 15 of the wagon-box C, adjacent the ends thereof, are stakes, which are indicated by the reference numeral 18, and which, at their lower ends, project to a plane below the lower edge of the respective side walls 15, and seat in brackets 19 upon the outer side faces of the side sills 5, when the wagon-box is in assembled or set-up position upon the bed A. In a similar manner, the forward wall 16 of the wagon-box has secured thereon stakes 20. The wagon-box C embodies, further, an end gate, which is indicated by the numeral 21, and is permanently hinged as at 22 at its lower edge to the rear end edge of the flooring 7 of the wagon-bed A, this hinged connection of the end gate with the said flooring being of such character as to permit of swinging down of the end gate to a position nearly flat against the rear face of the vertical wall 10 connecting the rear and front ends of the front and rear wagon beds respectively.

Secured upon the inner face of each of the side walls 15 of the forward wagon-box C is a bracket 23, which projects at its rear end beyond the rear end edge of the respective side walls, and engages through openings 24 formed in the end gate 21, there being hooks 25 pivoted upon the said end gate and engaging through openings in the rearwardly projecting end of the bracket 23, whereby to hold the said end gate in upright position. Brackets 26 are secured one upon each of the side walls 15 of the forward wagon-box and have their lower ends off-set laterally as at 27, and seating in openings 28 formed in the ends of a transversely extending cleat 29 upon the under side of the flooring 7 of the said wagon-box, at the rear end thereof, and these brackets, as will be readily understood, serve effectually to brace the rear end of the said wagon-box against spreading or overturning in an outward direction.

The rear wagon-box D is comprised, in part, of side walls, which are indicated by the numeral 30, and is further comprised of an end gate, indicated by the numeral 31. The side walls 30 are supported in set-up position upon the said bed by cleats 32, corresponding to the cleats 18 of the forward box C, secured upon each side wall 30, which, at their lower ends, seat in brackets 33 upon the side sills 8, the forward ends of the side walls 30 of the rear wagon-box engaging behind the rearwardly projecting edges of plates 34, which are secured upon the uprights 11. These side walls are further braced in upright position through the medium of a bracket 35, which is identical in construction with the bracket 26 and engages, at its lower laterally off-set end, in an opening formed at the end of a transverse cleat 36, upon the under side of the flooring of the bed B. The end gate 31 is hinged at its ends to the rear edge of the flooring 9 of the bed B, and, in so mounting the end gate, there are provided upon the said flooring, at the rear end thereof, suitable hinge leaves, and similar hinge leaves 38 are secured upon the rear face of the end gate 31, and are adapted to register with the hinge leaves 37 when the end gate is in set-up position, a hinge rod 39 being then passed through the eyes of the hinge leaves, whereby to connect the gate for swinging movement with the bed. Brackets 40, corresponding to the brackets 23, are carried by the side walls 30 of the wagon bed B and engage through openings 41, formed in the end gate 31, and are in turn engaged by hooks 42 upon the end gate, whereby the same may be held in upright position.

From the foregoing description of the invention it will be understood that the floor of the rear wagon box is supported above the plane of the wheel base of the wagon a distance equal substantially to the height of the said box and that consequently the driver of the wagon may readily shovel the coal contained in this box, from the same while standing on the ground at the rear end of the box. After this box has been emptied of its contents, the driver stands upon the floor thereof, opens the end gate of the forward box and removes the coal from the said forward box in the same manner in which it was removed from the rear box. Therefore, the driver unloading the wagon will at all times and under all conditions shovel coal from a surface in a plane slightly above his knees and will consequently not be required to exert himself as much as is necessary in unloading the present construction of coal wagons. It will further be understood that when it is desired to deliver two half-tons or two tons to different parties, the portion to be delivered to one party may be placed into the forward box and the portion to be delivered to the other party in the rear box, the employment of fixed division boards or partitions being in this manner entirely obviated.

What is claimed is:—

In a vehicle body structure, vertically off-set beds, a box upon each bed, the front end wall of the rear box being in a plane with the rear end of the forward box and connecting the rear edge of the forward box and the forward edge of the rear box, and metallic beams bracing such connection, said beams having each parallel terminal portions secured to corresponding sides of the off-set beds, and an intermediate portion at right angles to the terminal portions secured to the end edges of the front end wall of the rear box.

In testimony that I claim the foregoing as my own, I have hereto affixed my signature in the presence of two witnesses.

SAMUEL G. McDOWELL.

Witnesses:
F. E. BATTERSON,
T. M. PLUMBLER.

Copies of this patent may be obtained for five cents each, by addressing the "Commissioner of Patents, Washington, D. C."